(12) United States Patent
Keh et al.

(10) Patent No.: US 11,354,777 B2
(45) Date of Patent: Jun. 7, 2022

(54) IMAGE PROCESSING DEVICE AND METHOD OF ELECTRONIC DEVICE

(71) Applicant: Samsung Electronics Co., Ltd., Suwon-si (KR)

(72) Inventors: Yongchan Keh, Suwon-si (KR); Byeonghoon Park, Suwon-si (KR); Youngkwon Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/978,655

(22) PCT Filed: Feb. 28, 2019

(86) PCT No.: PCT/KR2019/002409
§ 371 (c)(1),
(2) Date: Sep. 4, 2020

(87) PCT Pub. No.: WO2019/172577
PCT Pub. Date: Sep. 12, 2019

(65) Prior Publication Data
US 2021/0035267 A1 Feb. 4, 2021

(30) Foreign Application Priority Data
Mar. 6, 2018 (KR) ........................ 10-2018-0026170

(51) Int. Cl.
*G06T 5/00* (2006.01)
*G06T 7/521* (2017.01)
*H04N 5/33* (2006.01)

(52) U.S. Cl.
CPC .............. *G06T 5/001* (2013.01); *G06T 7/521* (2017.01); *H04N 5/33* (2013.01); *G06T 2207/10048* (2013.01)

(58) Field of Classification Search
CPC .... G06K 9/00255; G06K 9/03; G06K 9/2018; G06K 9/2027; G06K 9/346; G06T 2207/10048; G06T 5/001; H04N 5/33
See application file for complete search history.

(56) References Cited

U.S. PATENT DOCUMENTS 6,285,781 B1 9/2001 Yamazaki
8,687,909 B2 4/2014 Tezaur
(Continued)

FOREIGN PATENT DOCUMENTS

| KR | 10-2015-0109187 A | 10/2015 |
| KR | 10-2016-0031819 A | 3/2016 |
| KR | 10-1695252 B1 | 1/2017 |

OTHER PUBLICATIONS

International Search Report dated Jun. 11, 2019 in connection with International Patent Application No. PCT/KR2019/002409, 2 pages.
(Continued)

*Primary Examiner* — Kathleen V Nguyen

(57) ABSTRACT

According to various embodiments of the present invention, an electronic device can comprise: a light source configured to allow light, excluding a visible light band, to be incident on a designated pattern; a memory for storing designated pattern information; a camera configured to receive the light, which is incident from the light source and reflected by an external object; and a processor. The processor can be configured to: acquire a first image on an external object by using a camera, wherein the first image includes a pattern formed when the designated pattern is deformed by a curve of the surface of the external object; extract deformed pattern information from the first image by using the first image and the designated pattern information; and generate a second image from which the pattern deformed in the first (Continued)

image has been removed, by using the first image and the extracted deformed pattern information. Additional various embodiments are possible.

12 Claims, 8 Drawing Sheets

(56) References Cited

U.S. PATENT DOCUMENTS

| | | | |
|---|---|---|---|
| 2009/0095912 A1* | 4/2009 | Slinger | G06T 1/0007 |
| | | | 250/363.06 |
| 2010/0034429 A1* | 2/2010 | Drouin | G06T 7/521 |
| | | | 382/108 |
| 2013/0329101 A1 | 12/2013 | Choi et al. | |
| 2015/0036105 A1* | 2/2015 | Ide | G01S 17/08 |
| | | | 353/31 |
| 2015/0362989 A1* | 12/2015 | Tyagi | H04N 5/33 |
| | | | 345/156 |
| 2016/0335773 A1* | 11/2016 | Romano | G06T 7/521 |
| 2017/0004355 A1 | 1/2017 | Fan | |
| 2019/0182456 A1* | 6/2019 | Ma | G06K 9/00771 |

OTHER PUBLICATIONS

Written Opinion of the International Searching Authority dated Jun. 11, 2019 in connection with International Patent Application No. PCT/KR2019/002409, 5 pages.

Korean Intellectual Property Office, "Notice of Preliminary Rejection" dated Feb. 16, 2022, in connection with Korean Patent Application No. 10-2018-0026170, 11 pages.

* cited by examiner

IMAGE PROCESSING DEVICE AND METHOD OF ELECTRONIC DEVICE

CROSS-REFERENCE TO RELATED APPLICATIONS

This application is a 371 of International Application No. PCT/KR2019/002409 filed on Feb. 28, 2019, which claims priority to Korean Patent Application No. 10-2018-0026170 filed on Mar. 6, 2018, the disclosures of which are herein incorporated by reference in their entirety.

1. Field

The present disclosure relates to a device and method capable of providing an infrared image from which a pattern of a structured light has been removed, in an electronic device.

2. Description of Related Art

As the performance of an electronic device is improved, various services and additional functions presented through the electronic device are being increased gradually. Also, to increase an effective value of the electronic device and satisfy various desires of users, various applications executable in the electronic device are being developed.

Among these applications, there are even those related with a camera function. By using a camera module installed in the electronic device, a user can photograph a self or photograph a background. The camera module of the electronic device can be used for the sake of biometrics or vision recognition. The electronic device can use a plurality of images for the sake of biometrics or vision recognition.

An infrared camera of the electronic device may use a structured light so as to obtain depth information. The structured light may be a projector projecting a pattern. When an infrared image is acquired using the structured light, the infrared image may be acquired as an image which includes (overlays with) a pattern of the structured light. For example, when the infrared camera acquires a face image by using the structured light, the face image may be overlaid with the pattern of the structured light and thus may be heavily distorted. When intending to acquire a good-quality infrared image, the electronic device may acquire a separate infrared image by using an auxiliary light source (e.g., an IR LED illuminator, and a flood illuminator in Apple iPhone X). When the auxiliary light source is added besides the structured light in order to acquire the good-quality infrared image, the electronic device may cause problems such as a mounting space, a price, power consumption, etc.

An electronic device of various embodiments may provide a device and method capable of obtaining an infrared image by using a structured light and obtaining a deformed pattern included in the obtained infrared image, thereby providing the infrared image from which the pattern has been removed.

An electronic device of various embodiments may provide a device and method capable of simultaneously obtaining an infrared image and a visible light image by using a structured light, and obtaining a deformed pattern of the infrared image, to remove the deformed pattern included in the infrared image, and correcting the visible light image by using infrared image information from which the pattern has been removed.

An electronic device of various embodiments may provide a device and method capable of, in response to a peripheral brightness being darker than a specified brightness, simultaneously obtaining an infrared image and a visible light image by using a structured light, and obtaining a deformed pattern of the infrared image, to correct the visible light image.

SUMMARY

According to various embodiments, an electronic device may include a light source configured to allow light, excluding a visible light band, to be incident on a specified pattern, a memory for storing first pattern information corresponding to the specified pattern, a camera configured to receive the light, which is incident from the light source and reflected by an external object, and a processor. The processor may be configured to obtain a first image on the external object by using a camera, wherein the first image includes a pattern formed when the specified pattern is deformed by a curve of the surface of the external object, and obtain second pattern information corresponding to the deformed pattern included in the first image by using the first image and the first pattern information, and provide a second image from which the pattern deformed in the first image has been removed, by using the first image and the obtained second pattern information.

According to various embodiments, a method for providing an image in an electronic device may include outputting a structured light having first pattern information corresponding to a specified pattern, to an external object, and obtaining a first image on the external object which is based on the structured light, wherein the first image includes a pattern formed when the specified pattern is deformed by a curve of the surface of the external object, and obtaining second pattern information corresponding to the deformed pattern included in the first image by using the first image and the specified pattern information, and providing a second image from which the pattern deformed in the first image has been removed, by using the first image and the obtained deformed pattern information.

To obtain an infrared image of a good quality, an electronic device of various embodiments may remove a pattern included in the infrared image which has been obtained using a structured light, without using an additional auxiliary light source (e.g., an IR LED, illuminator). An electronic device of various embodiments may save a mounting space, a price and power consumption of the auxiliary light source, and improve a quality of the restored infrared image by using a deformed pattern being based on depth information as a mask.

DETAILED DESCRIPTION

Various embodiments of the present disclosure are described below in detail with reference to the accompanying drawings.

Figure 1:
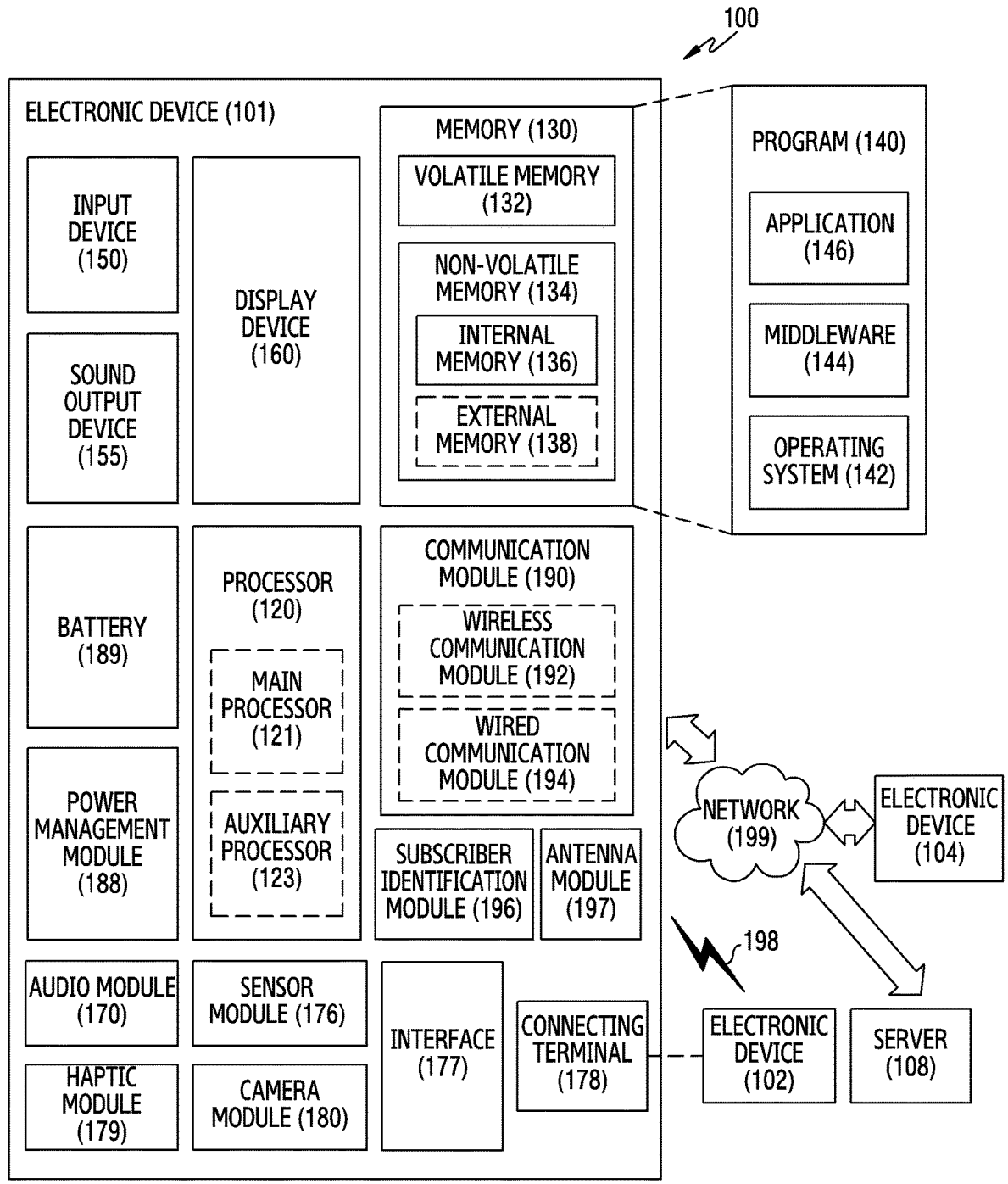
FIG. 1 is a block diagram of an electronic device 101 within a network environment 100 according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
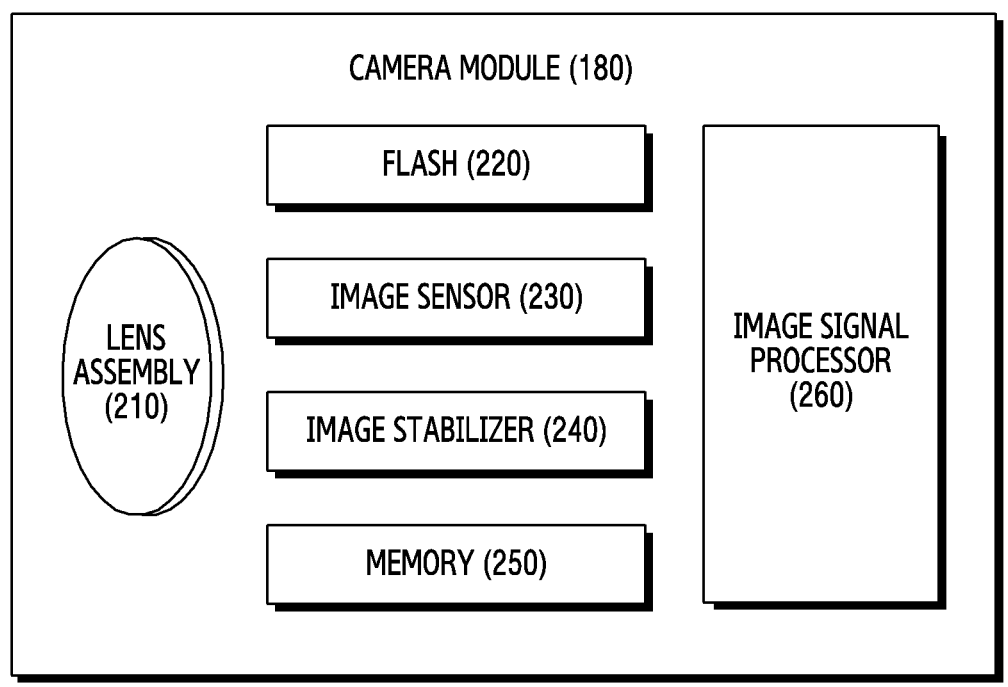
FIG. 2 is a block diagram 200 illustrating a camera module 180 according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
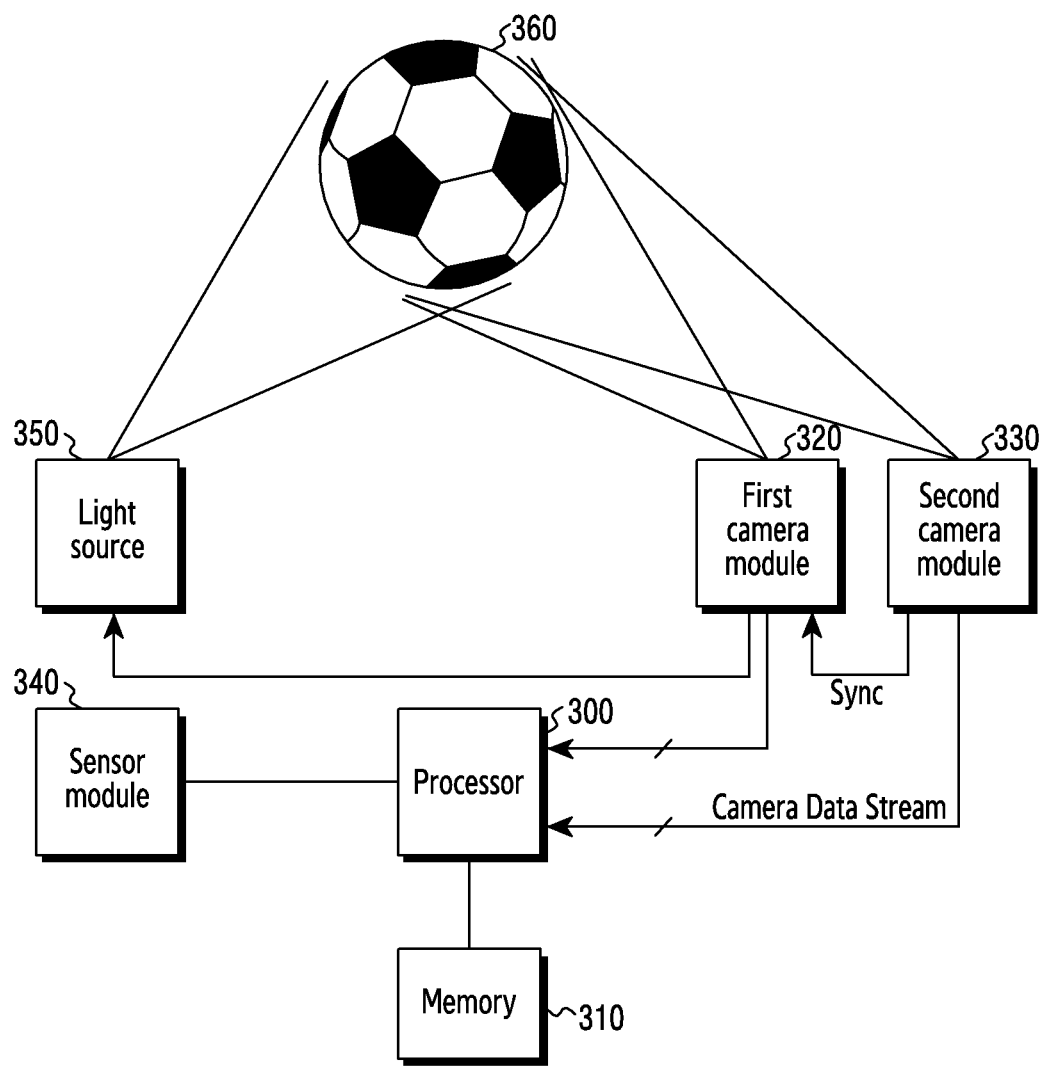
FIG. 3 is a diagram illustrating a construction of an electronic device according to various embodiments.

FIG. 3 is a diagram illustrating a construction of an electronic device according to various embodiments.

Referring to FIG. 3, the electronic device (e.g., the electronic device 101 of FIG. 1) may include a processor 300, a light source 350, a first camera module 320, a second camera module 330, and a sensor module 340.

An object 360 may be a subject that is an object of an image to be obtained. The object 360 may be people, an animal and/or a thing, etc. The object 360 may be a three-dimensional object which has a sense of three dimensions.

The light source 350 may be configured to allow light, which is not a visible light band, to be incident on a specified pattern. For example, the light source 350 may perform infrared light emission for depth information obtaining, and may use a structured light. The structured light may be an infrared projector projecting a pattern. The light source 340 may use a visible light or an infrared band light, and may include a pattern of a form of a point or line.

The memory 310 (e.g., the memory 130 of FIG. 1) may store various data which are used by at least one component (e.g., the processor 120, or the sensor module 176, of FIG. 1) of the electronic device. The data may include, for example, software and input data or output data about a command related to this. The memory 310 of various embodiments may store specified pattern information of the light source 350. The specified pattern information may be used as information for obtaining a deformed pattern included in an obtained image.

The first camera module 320 and the second camera module 330 may be configured to receive a structured light which is outputted from the light source 350 and is reflected by the external object 360. The first camera module 320 may be an infrared camera, and the second camera module 330 may be a visible camera. Each of images obtained from the first camera module 320 and the second camera module 330 may be obtained on the basis of the structured light, and the obtained image may include pattern information which is formed when a pattern of a structured light is reflected and deformed by the object 360. For example, the first camera module 320 and the second camera module 330 may be the camera module 180 of FIG. 1, and may have a construction as in FIG. 2.

The sensor module 340 (e.g., the sensor module 176 of FIG. 1) may include sensors sensing various peripheral information for obtaining an object image by using the camera modules 320 and 330. For example, the sensor module 340 may include an illuminance sensor. The illuminance sensor may sense a peripheral brightness when an image is obtained by using the camera modules 320 and 330.

By controlling the driving of the light source 350 and the camera modules 320 and 330, the processor 300 (e.g., the processor 120 of FIG. 1) may obtain a first image of the object 360. The processor 300 may obtain a deformed pattern of a structured light included in the obtained first image. By using the obtained deformed pattern, the processor 300 may determine depth information being based on a curve of the surface of the obtained first image. The processor 300 may provide a second image from which the deformed pattern obtained in the obtained first image has been removed.

According to an embodiment, the processor 300 may obtain the first image for the external object 360 by using the first camera module 320. The first image may be obtained with a pattern formed when a specified pattern of the light source 350 is deformed by a curve of the surface the external object 360. By using the first image and specified pattern information which is stored in the memory 310, the processor 300 may obtain deformed pattern information from the first image. By using the first image and the obtained deformed pattern information (e.g., by performing deconvolution using the obtained deformed pattern as a mask), the processor 300 may provide a second image from which the pattern deformed in the first image has been removed.

According to an embodiment, in a low light environment, the processor 300 may improve a quality of a visible light image by using the second image. The processor 300 may receive an output of the sensor module 340, to identify a peripheral brightness. In response to the peripheral brightness being equal to or being less than a set brightness, the processor 300 may drive the light source 350, and may drive the first camera module 320 and the second camera module 330. A structured light outputted from the light source 350 may be incident on the object 360. The first camera module 320 and the second camera module 330 may obtain an infrared image and a visible light image, respectively. In a low light situation, the infrared image may be an image of a higher sensitivity compared to the visible light image. The processor 300 may provide an infrared image (e.g., a second image) from which a pattern deformed in an infrared image (e.g., a first image) including a deformed pattern of the structured light has been removed. The processor 300 may improve a quality of the visible light image on the basis of the second image from which the pattern has been removed. For example, the processor 300 may improve a sensitivity of the visible light image which has been photographed with a low sensitivity, on the basis of the second image.

To perform functions of depth information of the image, iris recognition, etc., the electronic device may have a camera. Also, user's attention to the photographing performance of the electronic device with the camera is being increased gradually. To satisfy this user's desire, a trend is being increased in which the electronic device simultaneously employs the first camera module 320 (e.g., an infrared camera (an IR emitting source and an IR sensor)) and the second camera module 330 (e.g., an RGB (mono) camera).

The electronic device may obtain an object image being based on a structured light. A pattern of the structured light included in the obtained object image (first image) may be deformed by a curve of an object. The electronic device may obtain a deformed pattern on the basis of a specified pattern, and may determine depth information on the basis of the deformed pattern. Also, the electronic device may provide an image (i.e., a second image) from which the pattern deformed in the image including the deformed pattern has been removed. For example, the object may be people. The electronic device may remove a pattern included in an obtained people image and thereafter, perform a face recognition operation, to improve recognition performance.

The electronic device may have all of the first camera module 320 and the second camera module 330. When an image is obtained by using the second camera module 330, it may be difficult to obtain a visible light image of a good quality when a peripheral brightness is dark (low light state). In response to the peripheral brightness being dark, the infrared sensor may have a higher sensitivity than general visible light (RGB and mono) sensors. In response to it being a situation in which the peripheral brightness is dark, the electronic device may enhance a picture quality of the visible light image (i.e., an RGB image) by using information of an infrared image obtained from the infrared sensor. For example, in response to the peripheral brightness being dark, the electronic device may drive the light source 350, and synchronize the first camera module 320 and the second camera module 330, to obtain each of the infrared image and the visible light image. The electronic device may provide an infrared image from which a structured light pattern included in the infrared image has been removed, and improve a quality of the visible light image on the basis of the infrared image from which the pattern has been removed.

Figure 4A:
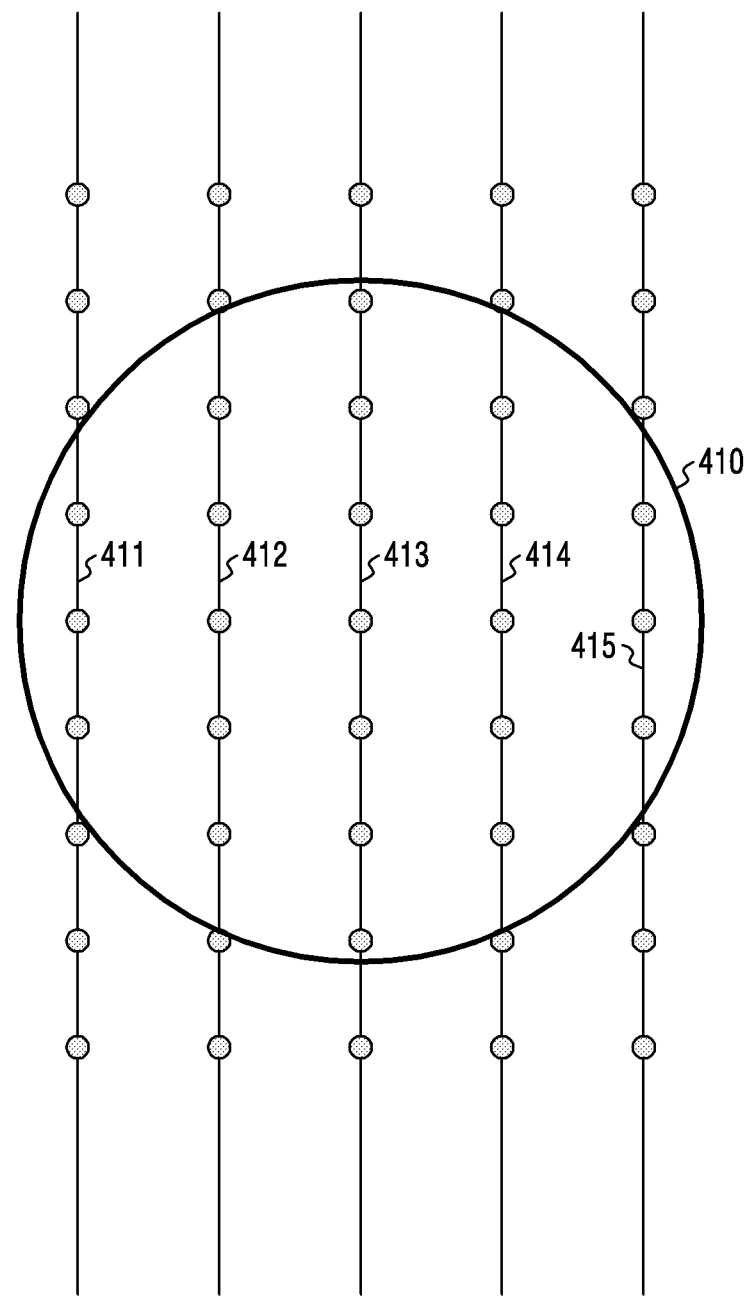
FIG. 4A and FIG. 4B are diagrams illustrating examples of a specified pattern, and a deformed pattern, of a structured light according to various embodiments.
Figure 4B:
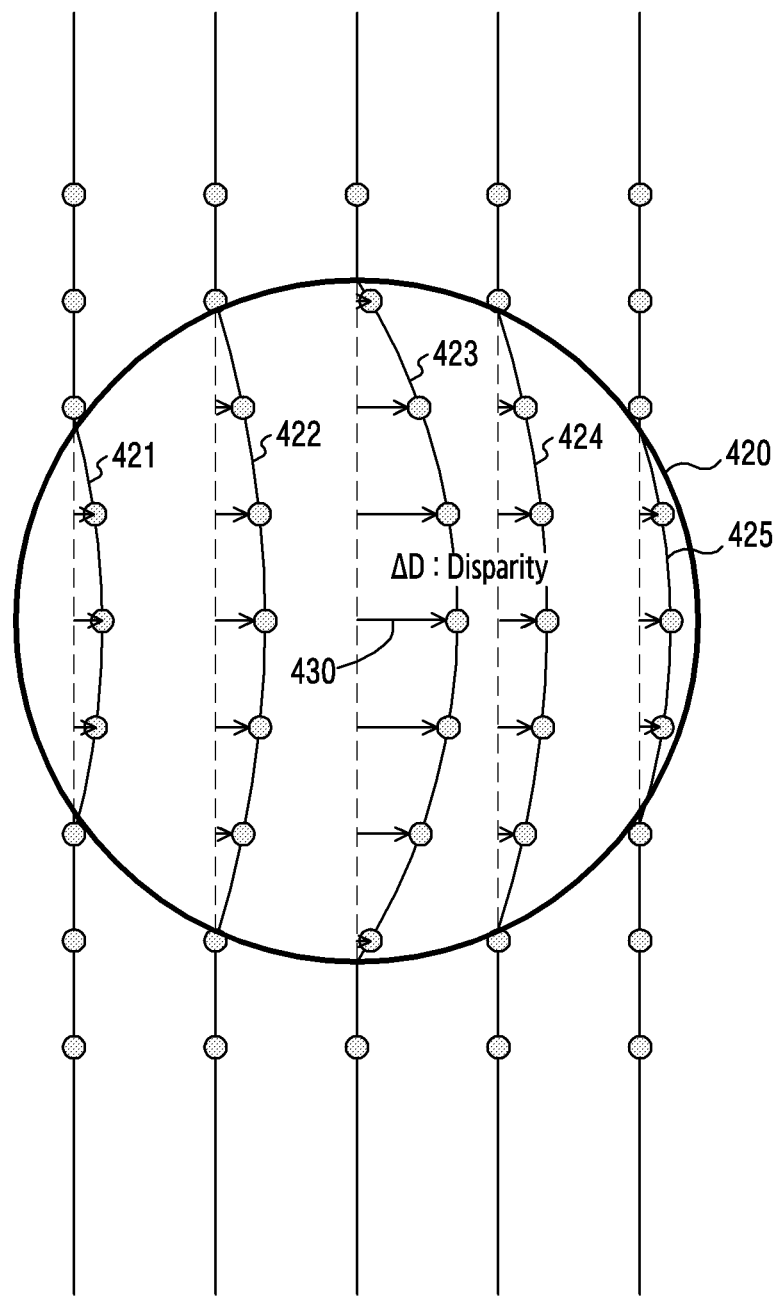

FIG. 4A and FIG. 4B are diagrams illustrating examples of a specified pattern, and a deformed pattern, of a structured light according to various embodiments.

Referring to FIG. 4A, a structured light outputted from the light source 350 may have a specified pattern. FIG. 4A may be an example of projecting a pattern to a plane. The pattern may be a specified pattern of a form of a dot or line as in 411 to 415. In FIG. 4A, in response to the object 360 being located in a position of 410, patterns located in a region of 410 may be shifted by a curve of the surface of the object 360 (e.g., sphere) and may be deformed as in 420 of FIG. 4B. For example, a structured light pattern of the region of 410 may be reflected by the object 360 and the pattern may be deformed as in 420. A camera module (e.g., the first camera module 320) may receive an image (e.g., the first image) with which the structured light having the deformed pattern is overlaid. The structured light may have a distortion dependent on a distance with the object 360 in the obtained image, and the distortion may be deformed in forms of 421 to 425 of FIG. 4B. For example, in response to the object 360 that has a form of a sphere being located in the structured light region of 410 of FIG. 4A, the structured light may be deformed as in 420 of FIG. 4B and may be incident on the first camera module 320. In this case, the patterns of 411 to 415 of FIG. 4A may be deformed by the object 360 as in 421 to 425 of FIG. 4B. The processor 300 may determine a magnitude ($\Delta D$: disparity) of the distortion dependent on the distance with the object 360 as in 430, to identify a depth.

The first image outputted from the first camera module 320 may include a deformed pattern (i.e., a deformed pattern of a structured light) by a shape (i.e., a three-dimensional shape) of an object. The processor 300 may map the first image and the original image, to obtain a disparity map, and determine a depth on the basis of the obtained disparity map. On the basis of the determined disparity map of FIG. 4A, the processor 300 may obtain the disparity map being the deformed pattern of the structured light as in FIG. 4B. The disparity map may be obtained by mapping a disparity of the original pattern, and the deformed pattern, of the structured light. For example, in response to the original pattern being measured at a long distance (e.g., 1 m), and the deformed pattern being measured at a short distance (e.g., <1 m), an amount (i.e., a shift amount (=disparity)) of the deformed pattern may be obtained. In response to the disparity being mapped in each feature of the pattern, the disparity map may be obtained.

According to an embodiment, the processor 300 may store the original pattern information of the structured light in the memory 310. The processor 300 may obtain a deformed pattern included in the first image obtained from the first camera module 320, and map the deformed pattern and the original pattern which has been stored in the memory 320, to obtain the disparity map.

According to an embodiment, the processor 300 may be aware of the original pattern and pattern (disparity) information deformed by a depth. In this case, the processor 300 may store the mapping information (disparity map) of original pattern and the deformed pattern in the memory 310.

In response to performing a deconvolution operation by using an amount (i.e., a disparity map) of the deformed pattern as a mask, the processor 300 may remove the deformed pattern included in the first image, to provide the second image.

Figure 5:
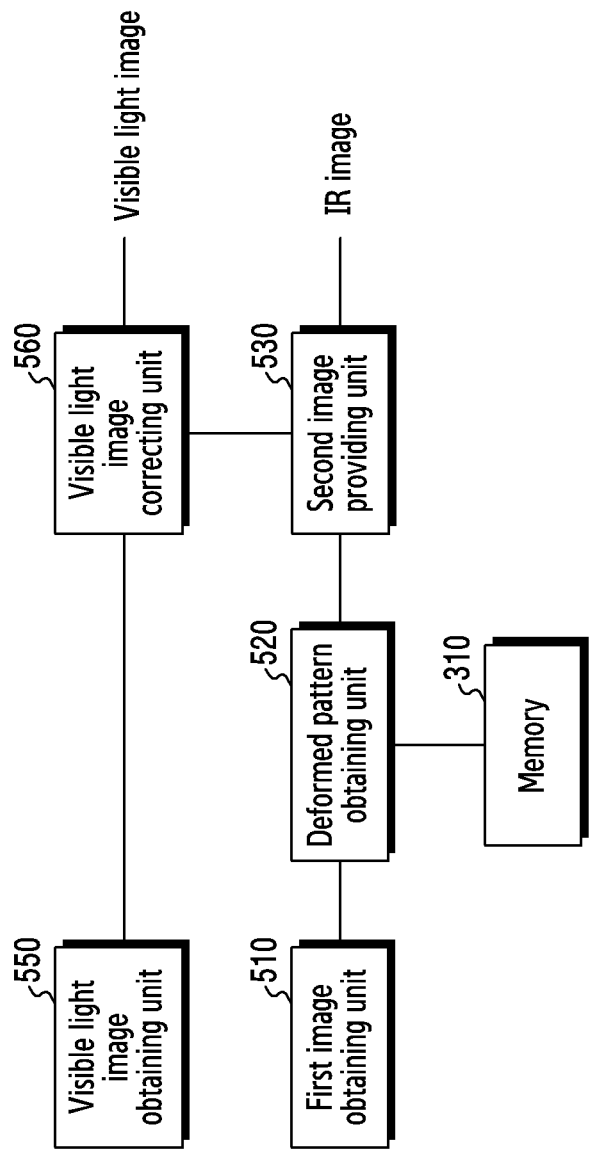
FIG. 5 is a diagram illustrating a construction of a device providing an image from which a pattern of a structured light has been removed in an electronic device according to various embodiments.

FIG. 5 is a diagram illustrating a construction of a device providing an image from which a pattern of a structured light has been removed in an electronic device according to various embodiments.

Referring to FIG. 5, the electronic device (e.g., the electronic device 101 of FIG. 1) may include the memory 310, a first image obtaining unit 510, a deformed pattern obtaining unit 520, a second image providing unit 530, a visible light image obtaining unit 550, and a visible light image correcting unit 560. In FIG. 5, the processor (e.g., the processor 120 of FIG. 1 and the processor 300 of FIG. 3) may include the first image obtaining unit 510, the deformed pattern obtaining unit 520, the second image providing unit 530, the visible light image obtaining unit 550, and the visible light image correcting unit 560.

To obtain a first image, the processor 300 may drive the light source 350 and the camera modules 320 and 330. The first image obtaining unit 510 may obtain the first image on the basis of pixel data which is outputted from the first camera module 320. The first image may be an image which includes patterns deformed by the object 360 as in 420 of FIG. 4B. The deformed pattern obtaining unit 520 may map specified pattern information (for example, original pattern information) stored in the memory 310 and a deformed pattern included in the first image, to obtain a disparity map. By applying deconvolution using an amount (i.e., the disparity map) of the obtained deformed pattern as a mask, the second image providing unit 530 may remove the deformed patterns included in the first image. A second image from which the deformed pattern has been removed (e.g., an infrared image from which a structured light pattern has been removed) may be used as an object recognition image. For example, in response to an object being a human face, the processor 300 may recognize a face image outputted from the second image providing unit 530, and may improve a recognition performance because it is a face image from which the structured light pattern has been removed.

The visible light image obtaining unit 550 may obtain a visible light image on the basis of pixel data which is outputted from the second camera module 330. The visible light image may be an RGB mono image. In response to the light source 350 being a structured light of an infrared band, the visible light image may not include a pattern of the structured light. The visible light image obtained in a low light situation (for example, a situation where a peripheral brightness is dark) may be an image of a degenerated picture quality. The visible light image correcting unit 560 may correct the visible light image on the basis of the second image, to improve a picture quality of the visible light image. For example, the visible light image correcting unit 560 may improve the picture quality of the visible light image which has been obtained at a low sensitivity.

The processor 300 may determine a depth of an infrared image which has been obtained on the basis of a disparity map obtained in the deformed pattern obtaining unit 520.

According to various embodiments, an electronic device may include a light source configured to allow light, excluding a visible light band, to be incident on a specified pattern, a memory for storing first pattern information corresponding to the specified pattern, a camera configured to receive the light, which is incident from the light source and reflected by an external object, and a processor. The processor may be configured to obtain a first image on the external object by using a camera, wherein the first image includes a pattern formed when the specified pattern is deformed by a curve of the surface of the external object, and obtain second pattern information corresponding to the deformed pattern included in the first image by using the first image and the first pattern information, and provide a second image from which the pattern deformed in the first image has been removed, by using the first image and the obtained second pattern information.

According to various embodiments, the camera may be an infrared camera configured to sense light of a wavelength corresponding to an infrared band.

According to various embodiments, the light source may be an infrared projector configured to output an infrared light including the specified pattern.

According to various embodiments, the processor may be configured to obtain depth information on the external object on the basis at least of a comparison of the pattern information and the deformed pattern information.

According to various embodiments, the processor may be configured to perform object recognition for the external object on the basis at least of the second image.

According to various embodiments, the electronic device may further include a visible light camera configured to receive a visible light reflected by the external object, and the processor may be configured to obtain a visible light image on the external object by using the visible light camera, and correct the visible light image on the basis at least of the second image.

According to various embodiments, the electronic device may further include a sensor module for sensing a peripheral light, and the processor may be configured to drive the light source in response to a brightness sensed in the sensor module being equal to or being less than a specified brightness.

Figure 6:
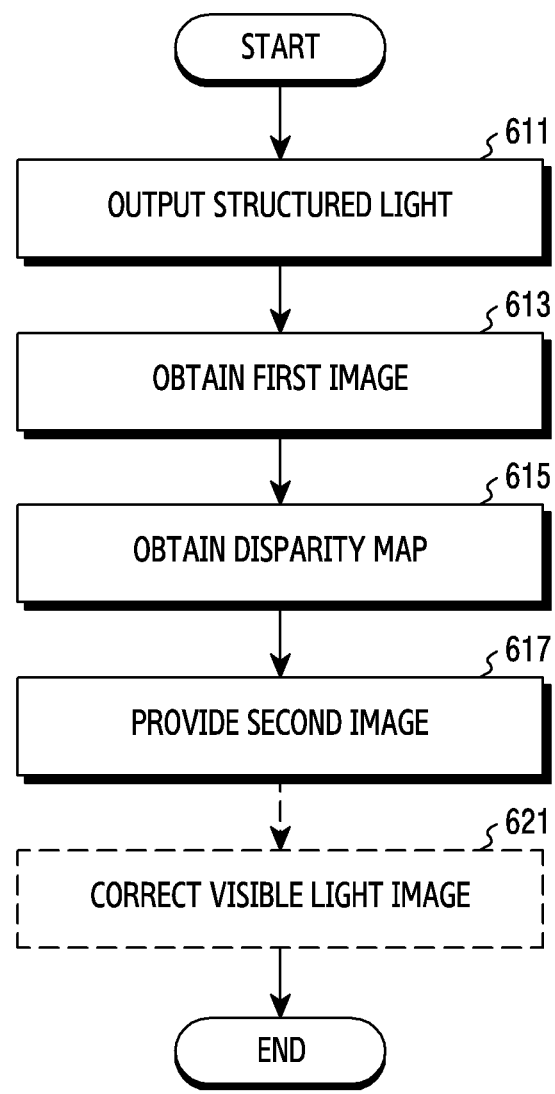
FIG. 6 is a flowchart illustrating an image processing method of an electronic device according to various embodiments.

FIG. 6 is a flowchart illustrating an image processing method of an electronic device according to various embodiments.

Referring to FIG. 6, in step 611, the electronic device (e.g., the electronic device 101 of FIG. 1 and the processor of FIG. 3 (e.g., the processor 120 of FIG. 1 and the processor 300 of FIG. 3)) may drive a light source (e.g., the light source 350 of FIG. 3), to output a structured light to an external object (e.g., the object 360 of FIG. 3). The structured light reflected by the external object may be received by a camera module (e.g., the first camera module 320 of FIG. 3). In step 613, the processor may obtain a first image including a deformed pattern of the structured light through a camera. In step 615, the processor may obtain a disparity map of the first image. In step 617, the processor may remove (mask-based deconvolution) a pattern deformed in the first image, by using the obtained deformed pattern as a mask. A second image may be an image from which the pattern deformed in the first image has been removed. In step 621, the processor may perform an object recognition function on the basis of the second image, and may correct a visible light image on the basis of the second image.

Figure 7:
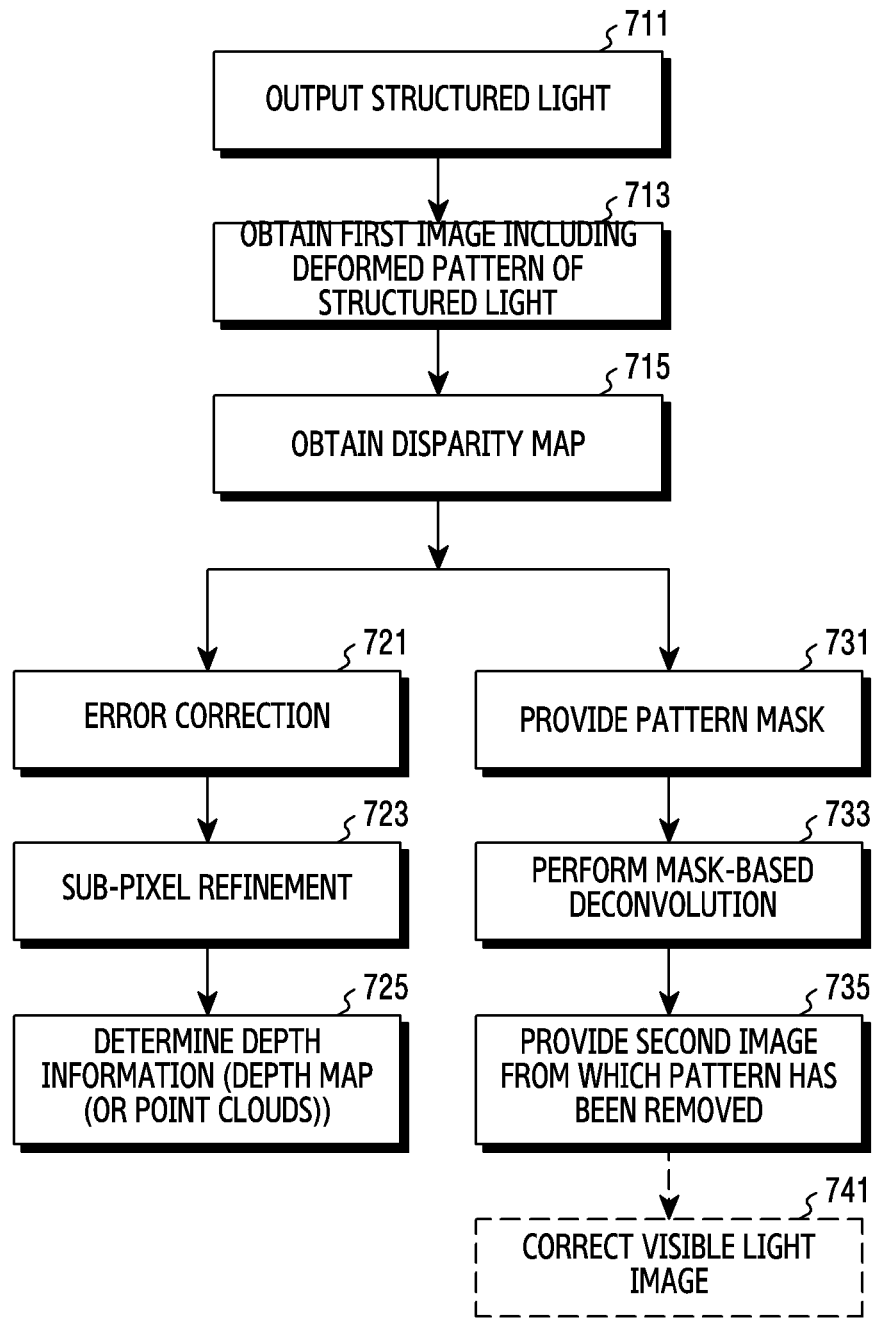
FIG. 7 is a flowchart illustrating an image processing operation of an electronic device according to various embodiments.

FIG. 7 is a flowchart illustrating an image processing operation of an electronic device according to various embodiments.

Referring to FIG. 7, in response to being aware of a specified pattern of a structured light (e.g., in response to storing the specified pattern in the memory 310 of FIG. 3), in step 711, the electronic device (e.g., the electronic device 101 of FIG. 1 and the processor of FIG. 3 (e.g., the processor 120 of FIG. 1 and the processor 300 of FIG. 3)) may drive a light source (e.g., the light source 350 of FIG. 3), to output the structured light to an external object (e.g., the object 360 of FIG. 3). The structured light reflected by the external object may be received by an infrared camera (e.g., the first camera module 320 of FIG. 3). In step 713, the processor may obtain a first image including a deformed pattern of the structured light through the infrared camera.

After obtaining the first image, in step 715, the processor may obtain a disparity map. In response to being aware of the specified pattern of the structured light (in response to storing a specified pattern of a light source in the memory), in step 715, the processor may map the specified pattern and the deformed pattern which is included in the first image, to obtain the disparity map. In step 731, the processor may provide (i.e., pattern estimation/localization (identifying of a pattern pixel)) a pattern mask being based on an amount (i.e., the disparity map) of the deformed pattern, and in step 733, may apply (pattern deconvolution/extraction (removing pattern pixels)) deconvolution by using a mask being based on the disparity map, to remove the deformed patterns of the structured light included in the first image. In step 735, the processor may fill in a location where a pattern pixel has been removed, to restore the image (inpainting (filling of pattern pixel)). The restored image may be a second image from which the deformed pattern of the structured light has been removed. In step 741, the processor may perform an object recognition function on the basis of the second image, and may correct a visible light image on the basis of the second image.

The processor may determine depth information by using the disparity map obtained in step 715. In step 721, the processor may correct an error of the obtained disparity map, and in step 723, may perform a sub-pixel refinement operation. In step 725, the processor may determine depth information (i.e., a depth map and point clouds) which is based on the deformed pattern of the first image.

According to various embodiments, an electronic device capable of obtaining depth information by using a structured light may obtain an infrared image of a good quality without adding a separate infrared light source (i.e., a light source not using the structured light, and an IR illuminator). The electronic device may obtain an infrared image from which a deformed pattern of a structured light has been removed using a mask-based image processing method (i.e., mask-based deconvolution)). In response to being aware of the original pattern of the structured light and being aware of the disparity map, the electronic device may obtain an image of a good quality from which a pattern in an image including the structured light pattern has been removed, by applying deconvolution by using the obtained deformed pattern as a mask. For example, in response to photographing a face image, the electronic device may remove a pattern included in a face infrared image, to obtain the face infrared image of a good quality. In response to performing an authentication function, the electronic device may improve a recognition efficiency of the face infrared image. Also, in response to obtaining a visible light image in a low light environment, the electronic device may synchronize and obtain the infrared image and the visible light image by using the structured light, and correct the visible light image by using an image from which the pattern in the infrared image has been removed.

According to various embodiments, a method for providing an image in an electronic device may include outputting a structured light having first pattern information corresponding to a specified pattern, to an external object, and obtaining a first image on the external object which is based on the structured light, wherein the first image includes a pattern formed when the specified pattern is deformed by a curve of the surface of the external object, and obtaining second pattern information corresponding to the deformed pattern included in the first image by using the first image and the specified pattern information, and providing a second image from which the pattern deformed in the first image has been removed, by using the first image and the obtained deformed pattern information.

According to various embodiments, the first image may be an infrared image capable of obtaining depth information of the external object.

According to various embodiments, outputting the structured light to the object may output an infrared light including the specified pattern through an infrared projector.

According to various embodiments, the image providing method of the electronic device may further include obtaining depth information on the external object on the basis at least of a comparison of the pattern information and the deformed pattern information.

According to various embodiments, the image providing method of the electronic device may further include performing object recognition for the external object on the basis at least of the second image.

According to various embodiments, the image providing method of the electronic device may further include obtaining a visible light image on the external object which is based on a visible light reflected by the external object, and correcting the visible light image on the basis at least of the second image.

According to various embodiments, the image providing method of the electronic device may further include identifying a peripheral brightness, and outputting an infrared light including the specified pattern in response to the peripheral brightness being equal to or being less than a specified brightness.

The invention claimed is:

1. A mobile communication device comprising:
a housing;
a light source disposed in the housing and configured to allow infrared (IR) light to be incident on a specified pattern;
a memory disposed in the housing and for storing first pattern information corresponding to the specified pattern;
an IR camera disposed in the housing and configured to receive the light, which is incident from the light source and reflected by an external object;
a visible light camera disposed in the housing and configured to receive a visible light reflected by the external object; and
a processor disposed in the housing and configured to:
obtain a first image on the external object by using the IR camera, wherein the first image comprises a pattern formed when the specified pattern is deformed by a curve of a surface of the external object;
obtain a visible light image on the external object by using the visible light camera;
obtain second pattern information corresponding to the deformed pattern comprised in the first image by using the first image and the first pattern information;
provide a second image from which the deformed pattern in the first image has been removed, by using the first image and the obtained second pattern information; and
improve a quality of the visible light image based on the second image.

2. The mobile communication device of claim 1, wherein the light source is an infrared projector configured to output an infrared light comprising the specified pattern.

3. The mobile communication device of claim 1, wherein the processor is configured to obtain depth information on the external object based on a comparison of the first pattern information and the deformed pattern.

4. The mobile communication device of claim 1, wherein the processor is configured to perform object recognition for the external object based on the second image.

5. The mobile communication device of claim 4, further comprising: an illuminance sensor for sensing a peripheral light,
wherein the processor is configured to drive the light source in response to a brightness sensed in the illuminance sensor being equal to or being less than a specified brightness.

6. A method for providing an image in a mobile communication device, the method comprising:
outputting, by a light source of the mobile communication device, a structured light having first pattern information corresponding to a specified pattern, to an external object;
obtaining, by an infrared (IR) camera of the mobile communication device, a first image on the external object which is based on the structured light, wherein the first image comprises a pattern formed when the specified pattern is deformed by a curve of a surface of the external object;
obtaining, by a visible light camera of the mobile communication device, a visible light image on the external object;
obtaining, by a processor of the mobile communication device, second pattern information corresponding to the deformed pattern comprised in the first image by using the first image and the specified pattern information;
providing, by the processor a second image from which the deformed pattern in the first image has been removed, by using the first image and the obtained second pattern information, and
improving, by the processor, a quality of the visible light image based on the second image.

7. The method of claim 6, wherein the first image is an infrared image for obtaining depth information of the external object.

8. The method of claim 6, wherein outputting the structured light to the external object outputs an infrared light comprising the specified pattern through an infrared projector.

9. The method of claim 6, further comprising obtaining depth information on the external object based on a comparison of the first pattern information and the deformed pattern.

10. The method of claim 6, further comprising performing object recognition for the external object based on the second image.

11. The method of claim 6, further comprising:
identifying, by an illuminance sensor of the mobile communication device, a peripheral brightness; and
outputting an infrared light comprising the specified pattern in response to the peripheral brightness being equal to or being less than a specified brightness.

12. The method of claim 6, wherein providing the second image comprises:
providing a pattern mask which is based on an amount of the obtained second pattern; and
deconvoluting the first image by using the pattern mask, to provide the second image from which the deformed pattern in the first image has been removed.

* * * * *